Oct. 15, 1935.         R. WILLEKE         2,017,426
BEVERAGE CONTAINER
Filed Sept. 1, 1933
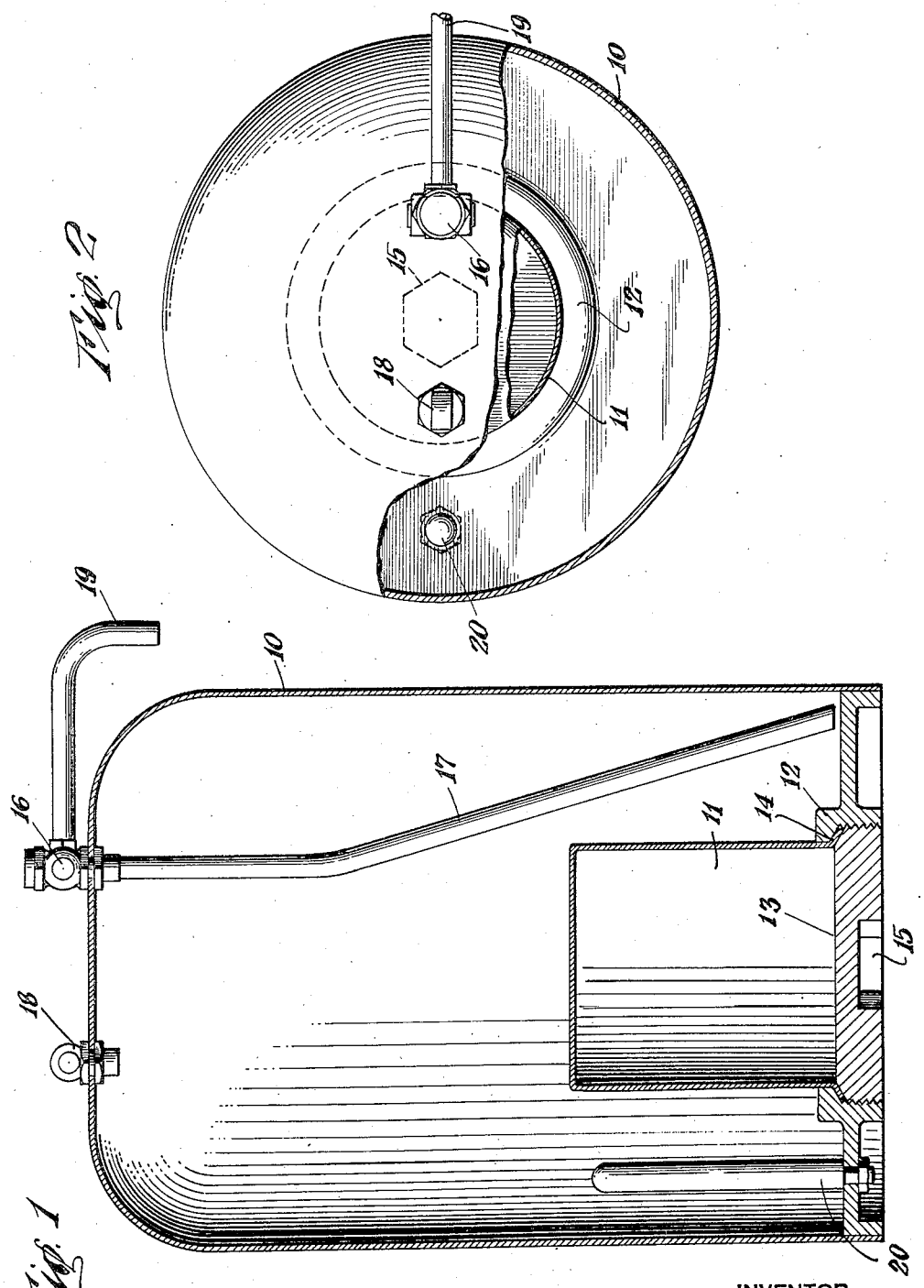
INVENTOR
Renz Willeke
BY
ATTORNEY Patented Oct. 15, 1935

2,017,426

UNITED STATES PATENT OFFICE 2,017,426

BEVERAGE CONTAINER

Renz Willeke, Bronx, N. Y., assignor to Bepco, Inc., New York, N. Y.

Application September 1, 1933, Serial No. 687,753

1 Claim. (Cl. 225—40)

This invention relates to improvements in containers, particularly containers for the dispensing of beverages, and it is the principal object of my invention to provide a beverage tank in which the beverage is sanitarily kept either constantly cool, fresh and palatable, or in which it may be heated, while the tank may be conveniently and safely transported from place to place and allows the ready serving of the beverage from the same.

Another object of my invention is the provision of a beverage container equipped with means for conveniently removing any surplus of pressure which may prevail in the container.

Still another object of my invention is the provision of a sanitary beverage container or tank so constructed as to allow a ready and thorough cleaning according to the sanitary laws.

A further object of my invention is the provision of a tank in which the beverage is kept constantly cool by a supply of dry ice or any other cooling medium.

A still further object of my invention is the provision of a heating unit built into the tank if it is desired to heat its contents.

These and other objects and advantages of my invention will become more fully known as the description thereof proceeds and will then be specifically defined in the appended claim.

In the accompanying drawing forming a material part of this disclosure:

Figure 1 illustrates a sectional elevation of a beverage tank or container constructed according to my invention.

Figure 2 is a top plan view thereof with the cover partly broken away.

As shown, the tank 10 of any suitable material, appropriately lined with a sanitary lining, or not, has a smaller tank 11 formed within its outer wall for the reception of ice or any other suitable cooling medium.

The upper end of the tank is closed while an opening in its bottom is formed by a raised and threaded flange 12 to be closed by a screw plug 13 having its upper edge bevelled to engage the flanged lower end 14 of the small ice tank 11 for holding the same in position within tank 10 by means of the nut 15. Suitable tightening means are provided to prevent leaking at this point.

The beverage with which the tank is filled, is kept under constant pressure of a charge of a suitable gas, air or sterilized liquid gas, introduced through a charge valve 16 and tube 17. Any surplus of pressure eventually prevailing in the container is removed through the air relief valve 18.

The outlet 16 is kept sealed during the transportation of the container and an outlet or dispensing cock and pipe is inserted into the valve body 16 and the beverage is then dispensed through the tube 19 which may for this purpose be controlled by a suitable valve.

If it is desired to heat the liquid in container 10, the ice container may be removed and the heating unit 20 be attached to any convenient source of electricity by suitable cables and plugs.

It will be clear from the above description and simultaneous reference to the drawing that the charged container may be readily transported from place to place, and then placed on a table, picnic ground, store, or any other place and that the beverage dispensed will always be kept fresh under constant pressure, cooled by the ice or cooling medium, and by the removal of the air accumulating above the beverage during its dispensation from time to time will always be kept in a palatable state.

It will be understood that I have disclosed the preferred form of my invention only as one example of the many possible ways to practically construct the same and that I may make such changes in its general arrangement and in the construction of its minor details as come within the scope of the appended claim without departure from the spirit of my invention and the principles involved.

Having thus described my invention what I claim as new and desire to secure by Letters Patent is:

In a liquid storing and dispensing container having a bottom formed with an opening, a raised and threaded flange encircling said opening within said tank, a screw plug having its upper edge bevelled, and a small ice tank removably held in said container by engagement of its flanged lower end with the bevelled edge of said plug, a nut for locking the parts in their relative position, a charge valve and tube for charging the liquid in said container with a gas and to dispense the beverage from said container, and a relief valve at the top of said container to release any surplus of pressure in the container.

RENZ WILLEKE.